July 19, 1932.  J. J. LOW  1,868,173

RUNNING GEAR

Filed April 1, 1929  3 Sheets-Sheet 1

Inventors
John Judson Low
By Lyon & Lyon
Attorneys

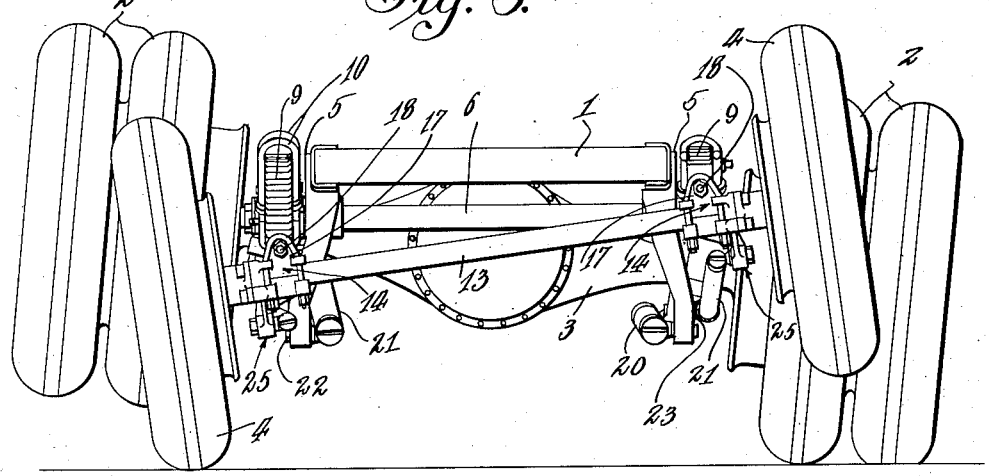
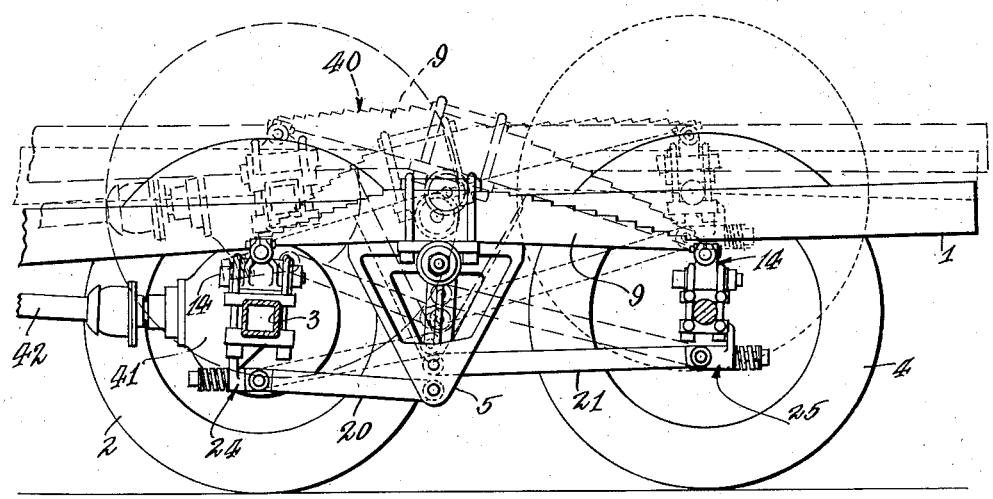

Patented July 19, 1932

1,868,173

UNITED STATES PATENT OFFICE

JOHN JUDSON LOW, OF LOS ANGELES, CALIFORNIA, ASSIGNOR TO SIX WHEEL CORPORATION, OF LOS ANGELES, CALIFORNIA, A CORPORATION OF CALIFORNIA

RUNNING GEAR

Application filed April 1, 1929. Serial No. 351,577.

This invention relates to running gears, and more particularly to what is commonly termed a six-wheel running gear or attachment for motor vehicle chassis construction or replacement as an attachment. In six-wheel constructions heretofore constructed and used, efforts have been made to provide a running gear construction of sufficient flexibility to accommodate all operating conditions required of such a structure without causing bending of the respective parts of the running gear or undue strain. Resort has been made to many forms of construction which, while they have been practical and operative to an extent where they have been commercially successful, have not given entire satisfaction due to their lack of flexibility and the fact that these constructions place upon the running gear, frame and entire chassis of the vehicle certain binding effects and strains which in time either destroy the efficiency of operation of the attachment or result in breakage.

It is therefore an object of this invention to provide a running gear for motor vehicles of the type including a plurality of rear wheels journaled on axles in which the oscillation of the axles is eliminated.

Another object of this invention is to provide a construction of multiple pairs of rear wheels in a running gear construction that is sufficiently flexible to accommodate all operating conditions without imposing upon the structure undue binding or undue strains.

Another object of this invention is to provide a running gear of what is commonly known as the six wheel type which will provide proper load distribution between the added wheels of the running gear and the driving wheels of the running gear and which will maintain the proper load distribution under all running conditions and will not transmit alternately the load from the respective parts or to the respective wheels of the running gear under operating conditions.

Another object of this invention is to provide a running gear of the six-wheel type which is so constructed as to permit installation and coordination of brakes upon all wheels of the running gear.

Another object of this invention is to provide a construction of running gear of the six-wheel type that will operate with a minimum of frame distortion and a minimum of frame movement under operating conditions, and which construction will eliminate excessive angularity of drive shaft universal joints and provides a minimum of unsprung load.

Other objects and advantages of this invention it is believed will be apparent from the following detailed description of a preferred embodiment thereof as illustrated in the accompanying drawings.

In the drawings:

Figure 3 is a rear elevation thereof illustrating the action of the running gear embodying this invention under extreme conditions.

Figure 4 is a side elevation of the running gear embodying this invention partly in section illustrating in dotted lines the relative positions taken or assumed by the wheels under operating conditions.

Figure 1:
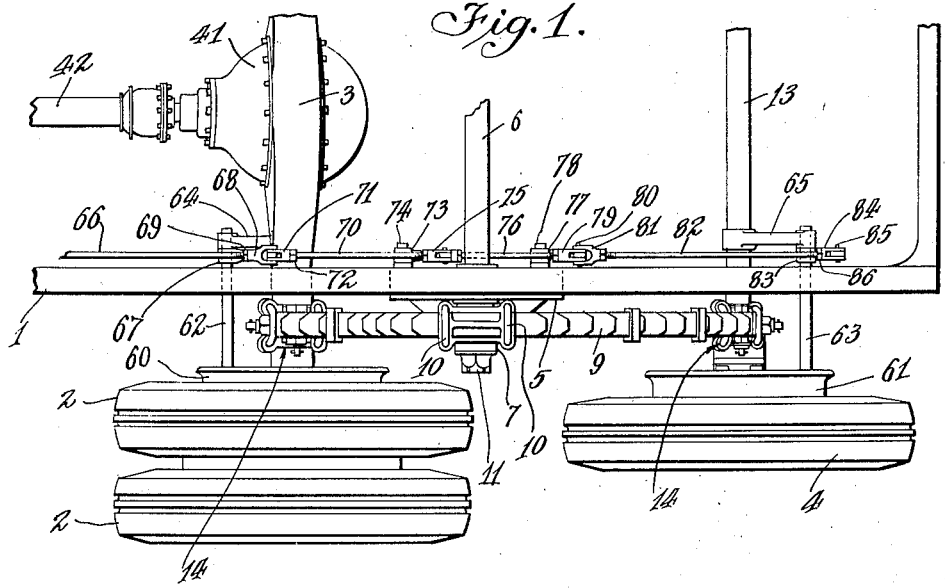
Figure 1 is a fragmental top plan view illustrating one side of a motor vehicle running gear embodying this invention.

In the preferred embodiment of this invention illustrated in the accompanying drawings, 1 indicates a frame of a motor vehicle which carries drive wheels 2 driven from the drive axle contained within the housing 3. The drive wheels 2, however, may be driven in any desirable or suitable manner common in the art, and this invention is in no way limited to application in connection with any particular manner of driving the drive wheels 2.

The second pair of wheels 4, usually termed the "attachment wheels", are operatively connected with the drive wheels 2 in order to distribute the load carried by the truck or motor vehicle between the wheels 2 and 4. In order to effect proper distribution of the load and to maintain proper distribution of the load between the wheels 2 and 4 under all conditions, the following preferred construction is provided which includes frame brackets 5 which are secured to the frame 1 on the opposite sides of the frame and are connected together by means of a connecting rod 6. The bracket 5 may be secured to the frame in any suitable or desirable manner such, for example, as by riveting, welding or bolting the same in position.

The rod 6 extends through the bosses 7 of each bracket 5 and is provided with a spring shackle saddle 8 by means of which the springs 9 are pivotally secured to the extensions of the rods 6 by means of the U-bolts 10. The ends of the rod 6 are threaded to receive nuts 11 and washers 12 to hold the saddles 8 in position. One end of the springs 9 is connected to the axle housing 3 while the opposite end of the springs 9 is connected with the attachment axle 13.

In order to permit correct distribution of the load between the wheels 2 and 4 under all operating conditions and to eliminate the imposition upon the frame and parts of the running gear of binding strains, the ends of the springs 9 are connected with the housing 3 and the attachment axle 13 through the use of universal joint connecting means 14. As substantially the same universal joint connecting means is used in each case, only one of these will be described.

The universal joint means includes a clevis 15 which is rigidly secured to the end of the spring in any suitable or desirable manner. The clevis 15 is pivotally connected by means of a pin 16 with a link 17. The link 17 is in turn pivotally connected by a bolt 18 with a saddle pad 19 which is secured either to the housing 3 or the attachment axle 13. By use of the universal joint means connecting the ends of the springs 9 with the axle housing 3 and the attachment axle 13, the wheels 2 and 4 are permitted to move to such position as may be required under all operating conditions without imposing undue strains on the structure.

In order to provide a structure which will hold the wheels 2 and 4 in proper working position while permitting the required flexibility of action, connecting rods 20 and 21 are provided which are pivotally connected at their adjacent ends by pins 22 and 23 to the brackets 5. The connecting rods 20 and 21 are connected at their opposed ends through a second form of universal attachments 25 and 24 to the axle housing 3 and attachment axle 13 respectively. As the universal joint attachment means 24 and 25 are of substantially the same construction, only one of these will be specifically described, and this universal attachment means includes a saddle 26 which is secured either to the axle housing 3 or attachment axle 13 immediately below the axle pads 19. In connecting the axle pads 13 and 19 to the axle or axle housing, bolts 27 are used which pass through both of the pads 26 and 19 and are secured in position by any suitable means such, for example, as by the use of U-bolts, as specifically illustrated in Figure 2 which pass around the axle pad 19 and through the axle pad 26 and are secured in position by nuts 28. The axle pads 26 have formed integral therewith angled extensions 29. A connecting member 30 is passed through a bore formed through the angled extension 29 and is held in position by means of a spring 31 which engages at one end the angled extension 29 and at its opposite end engages a washer 32 held in position by means of a nut 33. The opposite end of the member 30 is provided with two ears 34 between which the I end 35 of the connecting members 20 and 21 is fitted.

A bolt 36 is passed through the spaced ears 34 and through the I end 35 of the connecting members 20 or 21 pivotally connecting the rods 20 and 21 to the members 30. The members 30 are free to rotate in the bores formed through the angled extensions 29 of the axle pads 26.

The specific length of the members 20, 21, and of the springs 9 on the opposite sides of the rod 6 to the universal connection 14 depends upon the percentage of load distribution which it is desired to place upon the different wheels to the drive wheels and for the attachment wheels. In case it is desired that the greatest portion of load be carried upon the drive wheel 2, which is usually the case in order to insure driving contact with these wheels under all conditions of operation with the road surface, the length of the spring from the point of connection by means of the universal connecting means 14 from the axle housing 3 to the pivotal point of connection on the rod 6 is less than the distance or length of the spring from the rod 6 to the point of connection of the spring 9 through the universal connecting means 14 with the attachment axle 13.

In order that the driving wheels 2 and attachment wheels 4 may be properly held in position while permitting of great flexibility of the running gear provided in accordance with this invention, the lengths of the rods 21 and portion of the spring 9 from the rod 6 to the point of connection of the spring with the universal connecting means 14 are equal, and the distance between the center of the rod 6 and the center of the pin 23 and the center of the pin 16 and the center of the pin 35 are equal so that a parallelogram is provided by these connections. This is also true of the other connection of the spring 9 to the axle housing 3. The length of the spring 9 from the rod 6 to the point of connection of the spring through the universal connecting means 14 with the axle housing 3 is equal to the length of the rod 20 from the pin 35 of the universal joint means 24 to the center of the pin 22.

By use of the universal joint connecting means 14, 24 and 25, the attachment wheels are permitted to assume a position as illustrated in Figure 3 with one wheel raised from its normal running position as when the structure passes over a bump in the road-way or similarly the opposite attachment wheel 4 is allowed to pass into a depression in the road-way without placing a twisting strain upon the spring 9 or a twisting strain through the connecting rod 21 to the bracket 5. Therefore, no twisting strains are transposed from the attachment wheels 4 to either the springs 9 or the bracket 5 so that there are no bending strains transmitted through the bracket 5 to the frame 1 of the motor vehicle. The same condition of operation is true of the driving wheels 2 due to the use of the universal connecting means 14 and 24 by means of which the springs 9 and connecting rod 20 are connected with the axle housing 3.

The use of the two parallelograms for connecting the attachment axle 13 and axle housing 3 with the spring 9 and frame bracket 5 insures that no strains will be transmitted through the running gear embodying this invention to the bracket 5 or frame 1, because no matter what position the wheels 2 or 4 are caused to take within the limits of practical operation, the sides of these parallelograms will remain parallel, and the changes in curvature of the springs 9 will at all times be compensated for. For example, when one of the driving wheels 2 passes into a rut so that its position in relation to the attachment wheel 4 will be changed, the springs 9 will rotate on the rod 6 to substantially the position illustrated in dotted lines as indicated at 40 in Figure 4 while the bracket 5 maintains its original position without change. The entire frame, however, will pass downwardly, causing a relative movement between the pins 22 and 35 so that the rod 20 will remain parallel with the portion of the spring 9 connected with the axle housing 3. Under this condition the relative position of the springs 9 in relation to the axle housing 3 will change due to change in the curvature of the spring 9 which will be permitted through the use of the universal joint connecting means 14 without imposing bending or torsional strains on either the running gear itself or the driving mechanism. As the axle housing 3 is caused to take this inclined position, it naturally draws one drive wheel 4 transversely in relation to the frame 1 in one direction and causes the other drive wheel to move a corresponding amount.

This movement is permitted due to the use of the universal connecting means 14 and 24 and under the same conditions of operation the movement or shifting of the attachment axle is permitted due to the use of the universal connecting means 14 and 25.

The driving axle housing 3 will also be permitted to move freely as required under all conditions of operation without tending to bend or twist either the housing 3 itself or the drive shaft, as will be apparent from the diagrammatic illustration given by the dotted lines in Figure 4. The drive housing 3 due to the parallelogram formation of the suspension and attachment means and the use of the universal joints between the springs, connecting rods and respective drive and attachment axles permits the housing 3 to rotate freely to maintain the differential 41 of the drive connection between the drive shaft 42 and driven wheels 2 to remain in proper alignment.

Any strain that might be imposed on the structure because of elongation of the springs 9 due to reduction of the curvature of such springs 9 on the opposite sides of the truck is balanced by the springs 30 which are mounted upon the ends of the clevis bolts 28. These springs permit such elongation of the rods between the centers, the pivots 23 and 35 and 22 and 35, as may be required to compensate for the elongation of the springs 9, thus maintaining at all times accurate parallelogram construction between the respective portions of the springs 9 and rods 22 and 23.

Figure 2:
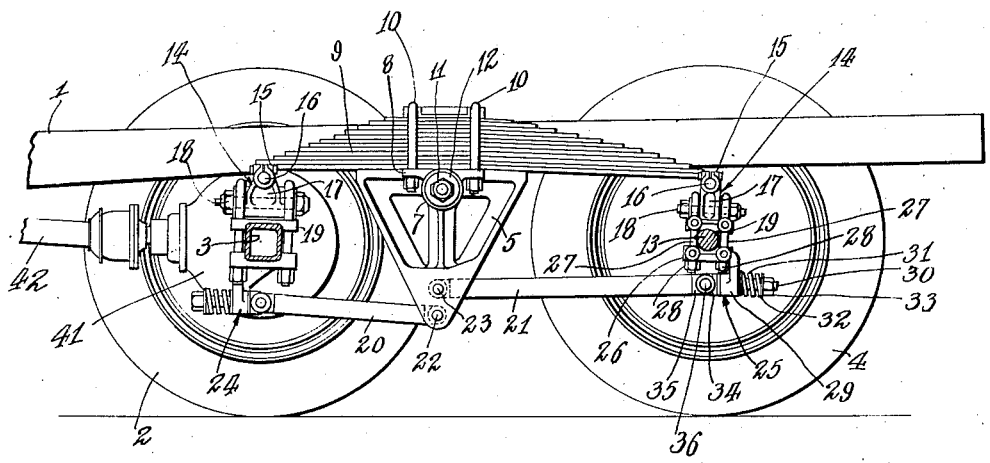
Figure 2 is a side elevation thereof.

In order that all parts of the structure will remain in proper working relation under all conditions as described, the distances vertically or substantially vertically, as illustrated in Figures 2 and 4 from the centers of the pivot pins 16 and 35 of the attachment axles, and 14 and 35 of the driven axle, are equal to the respective distances between the centers of the rod 6 and pin 23 and rod 6 and pin 22. This maintenance of equal distances completes the two parallelograms which connect the attachment axle and driven axle with the pivoted bracket 5.

Means are provided for actuating brakes connected with the drive wheels 2 and the attachment wheels 4, which means are preferably of the following construction.

Secured to each of the wheels 2 and 4 are brake drums 60 and 61 respectively. Any suitable or desirable form of brake means may be operatively connected in relation to the drums 60 and 61 such, for example, as by mounting within the drums 60 and 61 any of the well-known forms of internal expanding brake shoes which engage the inner cylindrical periphery of the drums 60 and 61. As the construction and mode of operation of such an internal expanding brake mechanism is well-known in the art, it is not believed necessary for applicant to particularly point out and describe the same.

The brake actuating means which are provided for actuating these brake mechanisms must be so connected together as to apply an equal braking force to the brake drums 60 and 61 under all operating conditions. In order to accomplish this result the actuating brake shafts 62 and 63 are journaled in brackets 64 and 65. The brackets 64 and 65 are secured to the axle housing 3, which carry the drive wheels 2 and to the attachment axle 13 upon which the attachment wheels 4 are journaled. A brake actuating rod 66, which extends forwardly from the wheels 2 and 4 to a point where it may be connected with any suitable or desirable form of actuating lever or pedal, is provided and this rod is pivotally connected to a lever 67 which is rigidly secured to the shaft 62. The rod 66 is adjustably secured to the lever 67 by means of a yoke 68, into which the end of the rod 66 is screw-threaded and held in position by a lock nut 69. The yoke 68 is secured to the end of the lever 67 by means of a pin passing through an eye formed in the end of the lever 67. A connecting rod 70 having a yoke 71 adjustably secured to its end by screw-threading the end of the rod 70 into the yoke 71 and locking the same in position by the lock nut 72 connects with the actuating lever 67 and yoke 68 by passing within the yoke 68 and having the pin which secured the yoke 68 to the end of the actuating lever 67 pass through eyes formed in the end of the yoke 71. The opposite end of the lever 70 is adjustably secured to a rocker arm 73 which is pivoted on a trunnion 74 extending inwardly from the bracket 5.

Adjustably secured to the yoke 75 by means of which the rod 70 is secured to the rocker arm 73 is a second connecting rod 76 which is adjustably secured to a second rocker arm 77 journaled on a trunnion 78 likewise secured to the bracket 5. The connecting rod 76 is secured to the end of the rocker arm 77 by means of an inner connecting yoke 79 and pin 80 which is positioned within a yoke 81 secured to the end of the attachment wheel brake actuating rod 82. The rod 82 is secured to a brake actuating lever 83 which is secured to the shaft 63 at one end and is pivotally and adjustably secured to the end of the brake actuating rod 82. This manner of pivotal and adjustable connection is formed by a yoke 84 which is pivotally connected by means of a pin 85 to the end of the actuating lever 83, and is adjustably secured to the end of the actuating rod 82 by having the end of the actuating rod 82 screw-threaded into the yoke 84 and held in position by means of a lock nut 86. With the link arrangement thus provided for actuating the brake mechanism mounted within the drums 60 and 61, it is obvious that as the wheels 2 and 4 are caused to take different positions relative to each other by variation of road conditions, that the link connection thus provided through the trunnions 74 and 78 and the fact that the connecting rods 70 and 82 are thus pivotally secured to the trunnions 74 and 78, are in their proportionate length of the same ratio as the lengths of the springs 9 which extend from the center of the pivotal support formed by the rod 6 to the centers of the pin 16 at the respective ends of such springs.

Therefore, as the wheels 2 and 4 move to assume different positions and the respective parallelograms connecting these wheels 2 and 4 with the frame are moved, the connecting rods 70 and 82 will move correspondingly so that the brake mechanisms mounted within the drums 60 and 61 will not be actuated to apply the brakes without actuation of the brake actuating rod 66.

Figure 5:
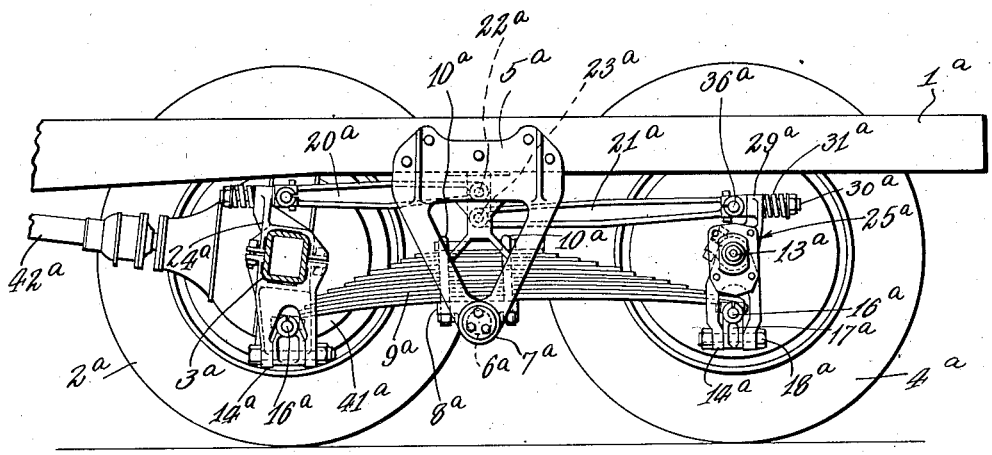
Figure 5 is a side elevation of a modified form of running gear embodying this invention illustrating the same as of the underslung type to accommodate certain conditions of frame clearance present in motor vehicles, particularly trucks of certain manufacture.

In the modified form of running gear illustrated in Figure 5, the same numerals refer to the same parts with the addition of an exponent ("a"). The construction here shown is the same as that illustrated in Figures 1 to 4 inclusive, except that the running gear here shown is adapted to an "underslug frame". The relative positions of the spring $9^a$ and rods $20^a$ and $21^a$ are reversed and the position of the rod $6^a$ is moved downwardly to pivotally support the spring pads upon which the spring $9^a$ is held. The specific structures of the universal joint connections of the axles with the springs are modified to sling the springs below the said axles, otherwise the structure is the same as illustrated in Figures 1 to 4.

Having fully described my invention, it is to be understood that I do not wish to be limited to the details herein set forth, but my invention is of the full scope of the appended claims.

I claim:

1. A running gear including a frame, a bracket mounted on each of opposite sides thereof, a pair of springs, means for pivotally mounting one of said springs intermediate the ends thereof on each of said brackets, a pair of spaced axles, a first universal connecting means for each end of each of said springs for pivotally connecting the ends of said springs to the ends of said axles at points located above the axis of each connected axle, a pair of connecting rods for each axle, a second universal connecting means for connecting one end of each rod of each pair to one end of each of said axles at a point located below the axis of the connected axle, and means for pivotally connecting the other end of each of said rods at each side of the frame to one of said brackets at a point located below the axis of said spring mounting means substantially equal to the distance between the pivotal centers of said first and second universal connecting means between the outer ends of said rods and the adjacent ends of each connecting axle.

2. A running gear including a frame, a bracket mounted on opposite sides thereof, a pair of springs, means for pivotally mounting one of said springs intermediate the ends thereof from each of said brackets, a pair of spaced axles, a first universal connecting means for each end of each of said springs for pivotally connecting the ends of said springs to the ends of said axles at points located above the axis of each connected axle, a pair of connecting rods for each axle, a second universal connecting means having a spring means for yieldingly and pivotally connecting one end of each rod of each pair to one end of one of each of said axles at a point located below the axis of the connected axle, and means for pivotally connecting the other end of each of said rods at each side of the frame to one of said brackets at a point located below the axis of said spring mounting means substantially equal to the distance between the pivotal centers of said first and second universal connecting means between the outer ends of said rods and the adjacent ends of each connecting axle.

Signed at Los Angeles, Calif., this 25th day of March, 1929.

JOHN JUDSON LOW.